United States Patent [19]

Smallwood et al.

[11] Patent Number: 4,900,574
[45] Date of Patent: Feb. 13, 1990

[54] SOLUBLE OR DISSOLVED TEA PRODUCT

[75] Inventors: Karen C. Smallwood, Dulcote; William J. Adams, Basingstoke, both of England

[73] Assignee: Mars G.B. Limited, London, United Kingdom

[21] Appl. No.: 317,054

[22] Filed: Feb. 21, 1989

Related U.S. Application Data

[63] Continuation of Ser. No. 154,441, Feb. 8, 1988, abandoned, which is a continuation of Ser. No. 812,120, Dec. 23, 1985, abandoned, which is a continuation-in-part of Ser. No. 784,701, Oct. 4, 1985, abandoned, which is a continuation of Ser. No. 634,811, Jul. 26, 1984, abandoned.

[30] Foreign Application Priority Data

Jul. 29, 1983 [GB] United Kingdom ............... 8320580
Dec. 21, 1984 [GB] United Kingdom ............... 8432509

[51] Int. Cl.$^4$ ............................................... A23F 3/14
[52] U.S. Cl. ................................ 426/330.3; 426/597
[58] Field of Search ............................ 426/507, 330.3

[56] References Cited

U.S. PATENT DOCUMENTS

| | | | |
|---|---|---|---|
| 2,476,072 | 7/1949 | Tressler | 426/597 |
| 2,553,467 | 5/1951 | Neef | 426/597 X |
| 2,860,987 | 11/1958 | Werner | 426/330.3 |
| 3,404,007 | 10/1968 | Muller | 426/597 X |
| 3,492,126 | 1/1970 | Rubenstein | 426/597 X |
| 4,004,038 | 1/1977 | Wickremasingle | 426/330.3 X |
| 4,051,267 | 9/1977 | Jongeling | 426/330.3 X |

FOREIGN PATENT DOCUMENTS

| | | | |
|---|---|---|---|
| 120417 | 10/1945 | Australia | 426/597 |
| 0011332 | 5/1980 | European Pat. Off. | 426/597 |
| 0005172 | 1/1983 | Japan | 426/597 |
| 6991 | of 1885 | United Kingdom | 426/597 |
| 26254 | of 1902 | United Kingdom | 426/597 |
| 23759 | of 1904 | United Kingdom | 426/597 |
| 1319439 | 6/1973 | United Kingdom | 426/597 |

OTHER PUBLICATIONS

Punnett, "What Causes 'Clouding' in Iced Tea?", Tea & Coffee Trade J., May 1956, pp. 17, 86-87.

Primary Examiner—Joseph Golian
Attorney, Agent, or Firm—Curtis, Morris & Safford

[57] ABSTRACT

A soluble or dissolved tea product which, when in water, provides a tea beverage with acceptable flavor quality. A tea liquor is prepared by extraction of leaf tea with hot water, a water-soluble caseinate (e.g. sodium caseinate) is added after tea cream formation upon cooling, or is added after tea cream formation to solubilize the latter. The liquor can be cold concentrated, and if necessary dried to form a solid product, e.g. by reverse osmosis followed by freeze drying.

28 Claims, 1 Drawing Sheet

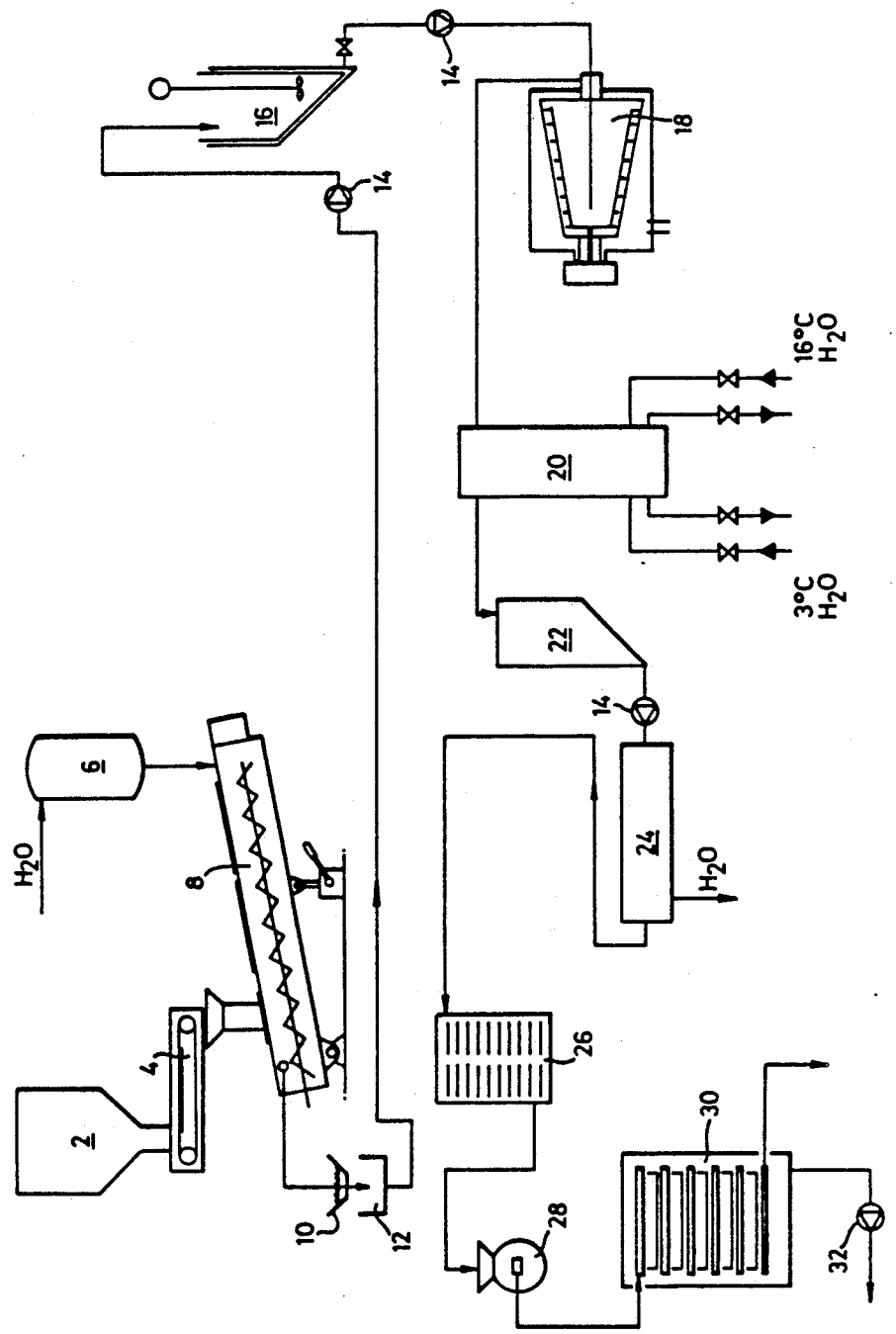

SOLUBLE OR DISSOLVED TEA PRODUCT

This application is a continuation of application Ser. No. 154,441, filed Feb. 8, 1988, now abandoned, which is, in turn, a continuation of Ser. No. 812,120, filed 12/23/85, now abandoned, which was a continuation-in-part of Ser. No. 784,701, filed 10/4/85, now abandoned, which was a continuation of Ser. No. 634,811, filed 7/26/84, now abandoned.

This invention relates to the production of a tea product (which may be either liquid or solid) derived from tea liquor (that is, a liquid obtained by infusing leaf tea in water). The product may be a liquid or a solid, which when diluted to normal tea strength, provides a tea beverage.

Soluble tea products ("instant teas") are normally manufactured by extraction of leaf tea with hot water, evaporative concentration of the tea extract (tea liquor), followed by spray- or freeze-drying of the concentrated liquor. Unfortunately, the concentration process destroys many of the desirable tea flavours and this is due mainly to the rise in temperature during the concentration step. Concentration methods which do not involve heat are known - for example freeze concentration or reverse osmosis. However, the use of such methods introduces a further complication resulting from the formation of tea cream.

When tea liquor is cooled below about 60° C., a bright orange opaque complex of turbid appearance known as tea cream forms. The presence of tea cream renders it impossible to cold concentrate the liquor by usual methods. Current methods for the production of instant tea either (a) remove the tea cream prior to cold concentration or (b) maintain the liquor at 70° C. or above to avoid tea cream forming. In the case of (a) much of the desirable flavour and colour is removed from the product with the tea cream, whereas with (b) the flavour is destroyed by prolonged heating. An alternative method is to remove the tea cream, cold concentrate the liquor and add the tea cream back to the product. Even this method destroys beneficial flavour. For a full description of the problems of tea cream formation see Food Technology Review No. 38, "Tea and Soluble Tea Products Manufacture", N. D. Pintauro, Noyes Data Corporation 1977.

We have now discovered a method of handling tea liquor which avoids the problems arising from tea cream formation yet allows the liquor to be processed or distributed as a homogeneous liquid at temperatures down to the point where it becomes frozen. The resulting liquor can thus be cold concentrated and/or dried to a powder, and either product when mixed with hot water, provides a tea beverage of highly acceptable flavour. The method involves the addition of water-soluble caseinate to the tea liquor, which we have found prevents tea cream forming.

There have been several published suggestions for the production of a soluble tea product in which a tea liquor has been converted to the product in the presence of some casein or possibly small amounts of a water-soluble caseinate as a consequence of processing the tea liquor with milk (casein being a component of milk). Typical of these is U.K. Specification No. 776565 in which it is stated that milk, sugar, lemon or other additive may be incorporated in the extracted liquor prior to final evaporation. The purpose of these proposals has not been to prevent tea cream forming, but to provide a product with an in situ whitener, sweetener etc. There is no suggestion in any of the prior proposals that sufficient milk should or has been employed to provide sufficient caseinate preventing tea cream forming, nor any appreciation that this effect arises.

According to the invention we provide a method of producing a soluble or dissolved tea product, which comprises forming a tea liquor by extraction of leaf tea with water, adding a water-soluble caseinate to provide a solution which is substantially clear at room temperature, said caseinate being added in an amount constituting from 5 to 50% by weight of the liquor/caseinate mixture on a dry weight basis, the liquor/caseinate mixture having a pH of from 4.5 to 7.5 and being allowed to adjust to a temperature at which in the absence of the caseinate tea cream would otherwise have formed, and concentrating the liquor/caseinate mixture to a liquor of higher solids content. Preferably the liquor/caseinate mixture is allowed to adjust to a temperature at which, in the absence of the caseinate tea cream would otherwise have formed, and concentrated to a liquor of higher solids content. More preferably the liquor is converted to a solid product.

The caseinate stabilises the liquor to prevent the formation of tea cream on cooling prior to cold concentration. This property is carried over into the solid product so that when it is dispersed in hot water and thereafter allowed to cool, tea cream again does not occur. However, the components of tea cream (e.g. theaflavins, thearubigins, and caffeine) are still present in the liquid—probably complexed with the caseinate in some form—and the beneficial tea flavours derived therefrom are substantially preserved. The stabilised tea liquor may be distributed as such (as a dilute solution), as a concentrated solution, or as a solid product. Alternatively a solution may be frozen and distributed thus.

According to a further aspect of the invention there is provided a liquid concentrate or solid tea product which comprises the solids content of a tea liquor which is formed by extraction of leaf tea with water and contains the components forming tea cream in an amount sufficient for the formation thereof, and a water-soluble caseinate to inhibit tea cream formation sufficiently to provide a solution which is substantially clear at room temperature, the pH of said liquor/caseinate mixture being 4.5 to 7.5 and the amount of caseinate constituting from 5 to 50% by weight of the liquor/caseinate mixture on a dry weight basis.

Preferably the conversion to a solid product is conducted in at least two stages: a first stage involving the concentration of the tea liquor/caseinate mixture to a liquid of higher concentration (e.g. by freeze concentration or reverse osmosis), followed by a second stage comprising converting the first stage liquid to a solid (e.g. by freeze- or spray-drying).

Preferably the tea liquor is formed by infusing leaf tea in hot water (above about 90° C.) Desirably the water is softened. The spent leaves may be removed from the liquor either prior to or after mixture with the caseinate Whilst we prefer to add the caseinate after extraction, the caseinate may be added at any stage prior to or after allowing the liquor to cool. For example, a dilute caseinate solution may be employed for extraction purposes. It is even possible to allow the liquor to cool, thus forming a tea cream precipitate, and then add the water-soluble caseinate (in solid or liquid form). Dispersion of the caseinate in the creamed tea liquor causes the latter to stabilise. The tea cream disappears to leave a clear solution for cold concentration.

The caseinate may be any water-soluble caseinate acceptable for human consumption, such as an alkali or alkaline earth metal caseinate. The preferred caseinate is sodium caseinate since this is not only very effective, but has a bland taste. The caseinate is preferably employed as a solution in water. The caseinate prevents the formation of tea cream and thus stabilises the liquor for any subsequent processing - which is preferably conducted without substantially raising the temperature, or for distribution. It is desirable that the stabilisation be conducted a quickly as possible and the mixture cooled swiftly. To maintain the liquor at high temperature for a long period of time causes the product to develop "stewed" flavour notes. It is preferred to cool the stabilised mixture to below 25° C., more preferably to 5° C. or below.

The amount of caseinate required for full stabilisation varies according to pH. At higher pH (more alkaline) less caseinate is required to prevent tea cream formation. On the other hand, if the pH is too high there can be a discolouration and a flavour change to the final product. Furthermore if a concentration step is employed, then gelling of the concentrated liquor can become a problem. A tea liquor/caseinate mixture having a pH of from 4.5 to 7.5 is normally employed, but preferably is from 5.0 to 6.5. If necessary the pH may be adjusted to be in this range. The pH may be adjusted prior to, during, or after the addition of caseinate but prior to cooling. These pH readings are those obtained with a standard pH meter as measured on the hot liquid. Since the liquor is normally on the acid side of this preferred range, we prefer to add an alkali such as sodium hydroxide to the liquor prior to stabilisation. The amount of caseinate employed is from 5 to 50% by weight, on a dry weight basis of the final product. Preferably the amount is from 10 to 40% by weight. With any given tea liquor, the amount of caseinate required for effective stabilisation may be determined by simple trial and error - it should be at least the amount that prevents any substantial formation, and preferably absolutely no formation, of tea cream when a hot mixture of liquor and caseinate is cooled.

The type of tea is not critical to the process and ordinary black leaf tea may be employed. The concentration of the tea liquor is also not critical, although obviously the higher the concentration the less water must be removed in forming the final product, if a concentrated or dry product is desired. We prefer to employ tea liquor having up to about 10% by weight of solids content.

An apparatus for conducting the method of the invention is illustrated schematically in FIG. 1 of the accompanying drawing, given by way of example.

The apparatus comprises a tea hopper 2, belt feeder 4, water heater 6, enclosed trough-type extractor having twin contra-rotating helical screws 8, sieve vessel 10, insulated mixing vessel 12, liquid pumps 14, stirred heated mixing vessel 16, decanter centrifuge 18, two stage plate surface heat exchanger 20, tank 22, reverse osmosis unit 24, freezer 26, granulator 28, tray freeze drier 30 and vacuum pump 32. All the components of the apparatus are conventional units commonly available for use in the food processing industry.

Examples 1 and 2 which follow illustrate use of this apparatus in accordance with the invention. The twin-screw extractor 8 was a Niro Atomiser Continuous Extractor, the reverse osmosis unit 24 was a 19 square meter DDS Type 30 module with Type HR98 membranes. The extractor 8 and unit 24 are available from Niro Atomizer Ltd., London.

Example 3 illustrates the addition of caseinate to cooled tea liquor in which the tea cream has already formed.

EXAMPLE 1

Broken orange pekoe tea was fed from hopper 2 on belt feeder 4 at the rate of 40 Kg per hour. The twin screw extractor 8 was inclined at 10° to the horizontal and the tea was fed into the lower end thereof. Water which had been softened by passage through an ion exchanger was fed to heater 6, heated to 97° C. and then sprayed into the top end of the extractor 8 at a rate of 480 liters per hour. The contra-rotating screws of extractor 8 moved at a speed of 4 rpm. The leaf tea was carried to the top of the extractor and discarded as waste whereas the tea liquor so formed by contact with the descending hot water left the bottom of the extractor through a scraped annular filter. The extract contained 5.3% by weight dissolved solids and was passed into mixing vessel 12 at a flow rate of 200 liters per hour via sieve 10. When 44 liters of extract had been collected, 0.4 liter of a 4% (by weight) sodium hydroxide solution was then mixed into vessel 12 to bring the pH to 5.6. 10.7 liters of a 9.5% (by weight) sodium caseinate solution were added to mixing vessel 16, heated to 80° C. and the contents of vessel 12 then transferred thereto and mixed. The pH of the mixture was 6.0. The liquid mixture was next passed through decanter centrifuge 18 to remove all suspended solids larger than 10 microns. It was then cooled to 5° C. by passage through heat exchanger 20 supplied, in the first stage, with the town water supply at 16° C., and with iced water at 3° C. in the second stage. The cooled liquor was collected in tank 22 and passed in batches of 400 liters through the reverse osmosis unit 24 to achieve a concentration of 20% by weight dissolved solids. The operating pressure of unit 24 was approximately 35 bar. The concentrated liquor was frozen on trays in freezer 26 to a temperature of −35° C. After passage through a granulator 28, the product was dried from a moisture content of about 80% by weight to less than 3% by weight in freeze drier 30 at a shelf temperature of 50° C. and a pressure of 100 millibars or less, maintained by vacuum pump 32. As a consequence of the reduced pressure, the ice sublimed to water vapour without passage through the liquid phase and this maintained the retention of flavour components to a high level. The finished product removed from freeze drier 30 was a brown granulated powder. When dissolved in hot water it provided a tea beverage of satisfactory flavour to which the usual ancillary components such as milk, lemon, or sugar could be added.

This Example illustrates the use of 30% by weight sodium caseinate, based on the weight of the final product.

EXAMPLE 2

Example 1 was repeated except that no sodium hydroxide was added to mixing vessel 12. The pH of the liquor in vessel 12 was 5.1. 17.1 liters of a 9.5% (by weight) sodium caseinate solution heated to 80° C. were used as the additive to mixing vessel 16, and the final liquor temperature after passage through heat exchanger 20 was 5° C. A product similar to that of Example 1 was achieved, but in this case 40% by weight sodium caseinate, based on the weight of the final product, had been employed.

EXAMPLE 3

706 g leaf tea (a blend of fannings and dust) was placed in a vessel of about 3 liters capacity, fitted with a warm water jacket. 4.5 liters of water at 90° C. was pumped into the vessel, allowed to stand for 5 minutes and ejected by pumping in air at 6 psi. The 2.8 liters of tea extract so obtained was cooled in a heat exchanger to 10° C. and then placed in a vessel with a bottom opening connected to a Lowara C70/5 Centrifugal Pump. (The tea creamed during the cooling stage and became a bright orange colour). The outlet to this pump was connected to an eductor made by KPX Eductors, 1 Park View, Binns Lane, Holmfirth, Huddersfield.

The pump was started and the eductor directed so as to recirculate the tea extract, back into the vessel. Powdered sodium caseinate (120 g) was fed into the solution through the throat of the eductor over a period of about 10 minutes. The caseinate dissolved and the solution remained pale brown because of air-entrainment. Once the pump was switched off and the air separated out, the liquid was no longer bright orange. This showed that the creaming had been reversed even though the temperature had not risen above 20° C.

The stabilised extract could then be concentrated by any low temperature process, such as described above.

We claim:
1. A liquid concentrate or solid tea product which consists essentially of the solids contents of a tea liquor which is formed by extraction of leaf tea with water and contains the components forming tea cream in an amount sufficient for the formation thereof, and water-soluble caseinate to inhibit tea cream formation sufficiently to provide a solution which is substantially clear at room temperature, the pH of said liquor/caseinate mixture being from 5 to 6.5 and the amount of caseinate constituting from 10 to 40 percent by weight of the liquor/caseinate mixture on a dry weight basis.

2. A tea product according to claim 1 wherein the water-soluble caseinate is an alkali metal caseinate.

3. A tea product according to claim 2 wherein said alkali metal caseinate is sodium caseinate.

4. A tea product according to claim 1 in granular or powder form.

5. A tea product according to claim 1 in liquid form.

6. A product as defined in claim 1, wherein the water-soluble caseinate consititutes from 30 to 40% by weight, on a dry weight basis, of the liquor/caseinate mixture.

7. A method of producing a soluble or a dissolved tea product, which consists essentially of forming a tea liquor by extraction of leaf tea with water, adding a water-soluble caseinate to provide a solution which is substantially clear at room temperature, said caseinate being added in an amount constituting from 10 to 40 percent by weight of the liquor/caseinate mixture on a dry weight basis, the liquor/caseinate mixture having a pH of from 5 to 6.5 and being allowed to adjust to a temperature at which in the absence of the caseinate tea cream would otherwise have formed, and concentrating the liquor/caseinate mixture to a liquor of higher solids content.

8. A method according to claim 7 which comprises converting the liquor/caseinate mixture to a solid product.

9. A method according to claim 8 which comprises cooling the liquor/caseinate mixture to below 25° C. prior to concentration and/or conversion to a solid.

10. A method according to claim 9 which comprises cooling the liquor/caseinate mixture to 5° C. or below.

11. A method according to claim 7 or 8 wherein the concentration and/or conversion to a solid product does not involve substantially raising the temperature of the liquor/caseinate mixture.

12. A method according to claim 7 which comprises reverse osmosis or freeze concentration.

13. A method according to claim 8 which comprises spray- or freeze-drying the liquor/caseinate mixture.

14. A method according to claim 7 wherein the extraction comprises contacting the leaf tea with water at a temperature of at least 90° C.

15. A method according to claim 7 which comprises mixing the liquor with an aqueous solution of the caseinate.

16. A method according to claim 7 which comprises adjusting the pH of the tea liquor with an alkali.

17. A method according to claim 7 wherein the proportion is from 10 to 40% by weight on a dry weight basis.

18. A method according to claim 7 wherein the caseinate is an alkali metal caseinate.

19. A method according to claim 18 wherein the caseinate is sodium caseinate.

20. A method as defined in claim 7, wherein the water-soluble caseinate is added in an amount constituting from 30 to 40% by weight, on a dry weight basis, of the liquor/caseinate mixture.

21. A method of producing a soluble tea product which consists essentially of forming a tea liquor by contact of leaf tea with hot water, mixing the liquid with the water-soluble caseinate and forming a liquor/caseinate mixture having a pH of from 5 to 6.5, cooling the mixture to below 25° C., concentrating the cooled liquid to a liquid of higher solids content and transforming the liquid of higher solids content to a solid, the amount of caseinate being sufficient to prevent the formation of tea cream upon said cooling and ranging from 10 to 40 percent by weight of the liquor/caseinate mixture on a dry weight basis, and said steps of concentrating and transforming being conducted without raising the temperature of the mixture.

22. A method as defined in claim 21, wherein the water-soluble caseinate is added in an amount constituting from 30 to 40%, on a dry weight basis, of the liquor/caseinate mixture.

23. A dry tea product, which consists essentially of
the solids content of a tea liquor which is formed by extraction of leaf tea with water and contains the components forming tea cream in an amount sufficient for the formation thereof, and a water-soluble caseinate in an amount sufficient to effect inhibition of tea cream formation to the extent that a solution which is substantially clear at room temperature is provided,
the pH of said liquor/caseinate mixture being from 5 to 6.5, and
the amount of caseinate constituting from 10 to 40% by weight, on a dry weight basis, of the liquor/caseinate mixture.

24. A product as defined in claim 23, wherein the water-soluble caseinate constitutes from 30 to 40%, on a dry weight basis, of the liquor/caseinate mixture.

25. A method of producing a liquid concentrate or a dry tea product, which consists essentially of
   forming a tea liquor by extraction of leaf tea with water,
   adding a water-soluble caseinate to the liquor before tea cream formation to provide a solution which is substantially clear at room temperature,
   said caseinate being added in an amount constituting from 10 to 40% by weight of the liquor/caseinate mixture on a dry weight basis,
   the liquor/caseinate mixture having a pH of from 5, to 6.5 and being allowed to adjust to a temperature at which, in the absence of the caseinate, tea cream would otherwise have formed, and
   concentrating the liquor/caseinate mixture to a liquor of higher solids content.

26. A method as defined in claim 25, wherein the water-soluble caseinate is added in an amount constituting from 30 to 40% by weight, on a dry weight basis, of the liquor/caseinate mixture.

27. A method of producing a liquid concentration or dry tea product, which comprises
   forming a tea liquor by extraction of leaf tea with water,
   allowing said liquor to adjust to a temperature sufficiently low to result in the formation of tea cream,
   adding a water-soluble caseinate to the liquor after tea cream formation, the caseinate being added in an amount constituting from 5 to 50% by weight of the liquor/caseinate mixture on a dry weight basis and in an amount sufficient to provide a solution which is substantially clear at room temperature,
   the liquor/caseinate mixture having a pH of from 4.5 to 7.5, and
   concentrating the liquor/caseinate mixture to a liquor of higher solids content.

28. A method as defined in claim 27, wherein the water-soluble caseinate is added in an amount constituting from 30 to 50% by weight, on a dry weight basis, of the liquor/caseinate mixture.

* * * * *